United States Patent [19]

Hirosaki et al.

[11] Patent Number: 4,621,355
[45] Date of Patent: Nov. 4, 1986

[54] METHOD OF SYNCHRONIZING PARALLEL CHANNELS OF ORTHOGONALLY MULTIPLEXED PARALLEL DATA TRANSMISSION SYSTEM AND IMPROVED AUTOMATIC EQUALIZER FOR USE IN SUCH A TRANSMISSION SYSTEM

[75] Inventors: Botaro Hirosaki; Hidehito Aoyagi, both of Tokyo, Japan

[73] Assignee: NEC Corporation, Tokyo, Japan

[21] Appl. No.: 637,140

[22] Filed: Aug. 3, 1984

[30] Foreign Application Priority Data

Aug. 4, 1983 [JP] Japan ................. 58-142920
Aug. 26, 1983 [JP] Japan ................. 58-156101

[51] Int. Cl.⁴ ............... H04J 11/00; H04J 13/00; H03H 7/30; H03H 7/40
[52] U.S. Cl. ............................ 370/19; 375/12; 375/14; 370/18; 370/21
[58] Field of Search ............... 370/19, 18, 21; 375/11, 375/13, 12, 14, 15, 40; 371/68; 178/22.01

[56] References Cited

U.S. PATENT DOCUMENTS

| | | | |
|---|---|---|---|
| 3,715,665 | 2/1973 | Chang | 375/13 |
| 3,775,685 | 11/1973 | Eggimann et al. | 375/11 |
| 4,021,738 | 5/1977 | Gitlin et al. | 375/14 |
| 4,164,628 | 8/1979 | Ward et al. | 370/19 |
| 4,233,683 | 11/1980 | McRae | 375/14 |
| 4,398,062 | 8/1983 | McRae et al. | 375/13 |
| 4,404,681 | 9/1983 | Hüllwegen | 375/11 |

Primary Examiner—Douglas W. Olms
Assistant Examiner—Wellington Chin
Attorney, Agent, or Firm—Schwartz, Jeffery Schwaab, Mack, Blumenthal & Evans

[57] ABSTRACT

A reference data sequence is transmitted and applied to a first automatic equalizer which is arranged in a reference channel. The transmitted reference data is used to establish an initial equalization of the first automatic equalizer. On the other hand, the transmitted reference data sequence is scrambled and is used to establish an initial equalization of another automatic equalizer to which another data sequence obtained by scrambling the reference data sequence is transmitted.

7 Claims, 12 Drawing Figures

FIG. 8
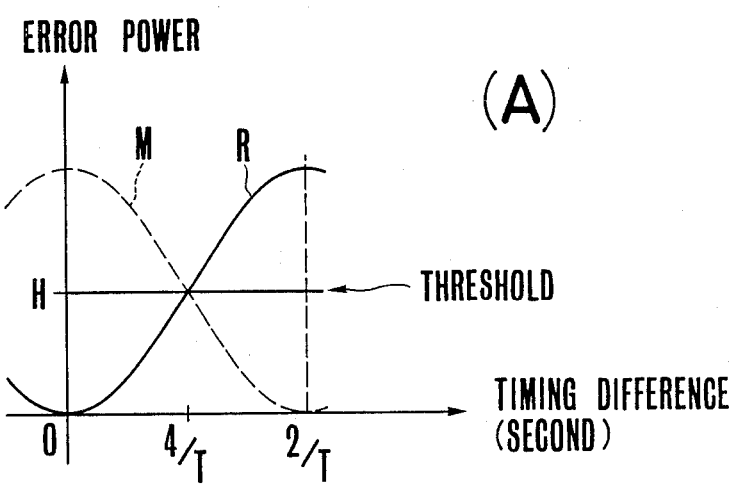
(A)
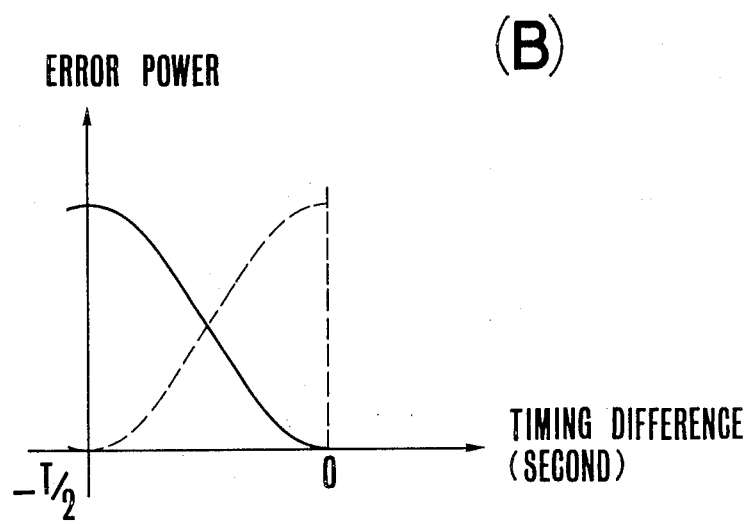
(B)

METHOD OF SYNCHRONIZING PARALLEL CHANNELS OF ORTHOGONALLY MULTIPLEXED PARALLEL DATA TRANSMISSION SYSTEM AND IMPROVED AUTOMATIC EQUALIZER FOR USE IN SUCH A TRANSMISSION SYSTEM

BACKGROUND OF THE INVENTION

1. Field of the Invention

The present invention relates to an orthogonally multiplexed parallel data transmission system for transmitting digital data via a plurality of channels wherein the orthogonalities of the channels must be strictly maintained at all times, and more specifically to (a) a method of synchronizing parallel channels of such a transmission system and (b) an automatic equalizer which features extremely rapid restoration of normal operation in the presence of excessive timing difference after being initially operated.

2. Description of the Prior Art

It is known in the art that an orthogonally multiplexed parallel data transmission system allows spectrum overlapping within a predetermined bandwidth, and hence attains a very high efficiency of data transmission up to approximately the efficiency of the ideal Nyquist transmission. Therefore, such a transmission system has found demands in systems wherein very high efficiencies of digital data transmission are important.

Such a data transmission system, however, requires that the parallel channel synchronization should be establised within a short time after the system is initially operated. To this end, the following two methods have been proposed.

A first known method is to insert a marker symbol into each channel at a predetermined time interval when transmitting information. A receiver detects the marker symbols and adjusts the time points of the markers detected in order to synchronize the parallel channels of the system. This method, however, has been encountered a problem that the insertion of the markers undesirably lowers the efficiency of information transmission.

According to a second known method, a receiver is arranged to previously store reference parallel symbol patterns. Thereafter, the same symbol patterns as prestored in the receiver are transmitted, prior to an actual data transmission, as training signals. At the receiver, the reference symbol patterns applied thereto, are compared with the reference signals previously stored therein in order to specify the transmission line characteristics, after which the parallel channels are synchronized using the inverse characteristics of the transmission line. This second method however has encountered the following problems: (a) the receiver should include a large capacity memory for prestoring the reference parallel symbol patterns and (b) complicated calculations are required to obtain the transmission line characteristics and the inverse characteristics thereof.

Further, this second method has another difficulty that a large eye-opening is not obtained due to a limited frequency resolution. More specifically, assuming that (a) the transmission bandwidth is "B" and (b) the number of the parallel channels is "N", then the frequency resolution is represented by B/N which is, in the case of the quadrature multiplexing system, approximately equal to a baud rate ($f_0$) of each channel. This means that a frequency resolution of the second method is defined by an interval of $f_0$. However, this value is not sufficient in that the frequency resolution in the order of $f_0/10$ is required for a large eye-opening of each channel. In order to overcome this problem, further complex calculations are needed with the second known method, although not mentioned for simplicity. For further details of the second method, reference should be had to "Frequency Domain Data Transmission using Reduced Computational Complexity algorithms", 1980 IEEE, pp. 964–967.

Further, there has been another problem with the above type of conventional system in that in the presence of excessive timing differences when initially operated, the automatic equalizers used therein are very slow in establishing normal operations thereof.

SUMMARY OF THE INVENTION

It is therefore an object of the present invention to provide a method of synchonizing parallel channels in a considerably short time duration and with a simpler circuit configuration as compared to the conventional methods.

Another object of the present invention is to provide an improved automatic equalizer which can restore to the normal operation thereof in a very short time duration even if an excessive timing difference is present when initially operated.

The present invention takes a form of a method of synchronizing parallel channels of an orthogonally multiplexed parallel data transmission system, comprising the steps of: (a) transmitting a reference data sequence via a reference channel, and transmitting a data sequence obtained by scrambling the reference data sequence via another channel; (b) receiving the reference data sequence at an automatic equalizing section which is arranged in the reference channel, and receiving the scrambled data sequence at another automatic equalizing section which is arranged in the other channel; (c) scrambling the received reference data sequence; (d) using the scrambled reference data sequence obtained in step (c) and the transmitted scrambled data sequence to establish an initial equalization of the another automatic equalizing section.

BRIEF DESCRIPTION OF THE DRAWINGS

The features and advantages of the present invention will become more clearly appreciated from the following description taken in conjunction with the accompanying drawings in which like blocks, circuits or circuit elements are denoted by like reference numerals and in which:

FIG. 8(A) is a graph showing two error powers via which explanation of the operation of the second embodiment is made;

FIG. 8(B) is a graph which corresponds to the FIG. 8(A) graph shifted by T/2 seconds in response to the detection of timing difference in excess of a predetermined level;

DETAILED DESCRIPTION OF THE PREFERRED EMBODIMENTS

Figure 1:
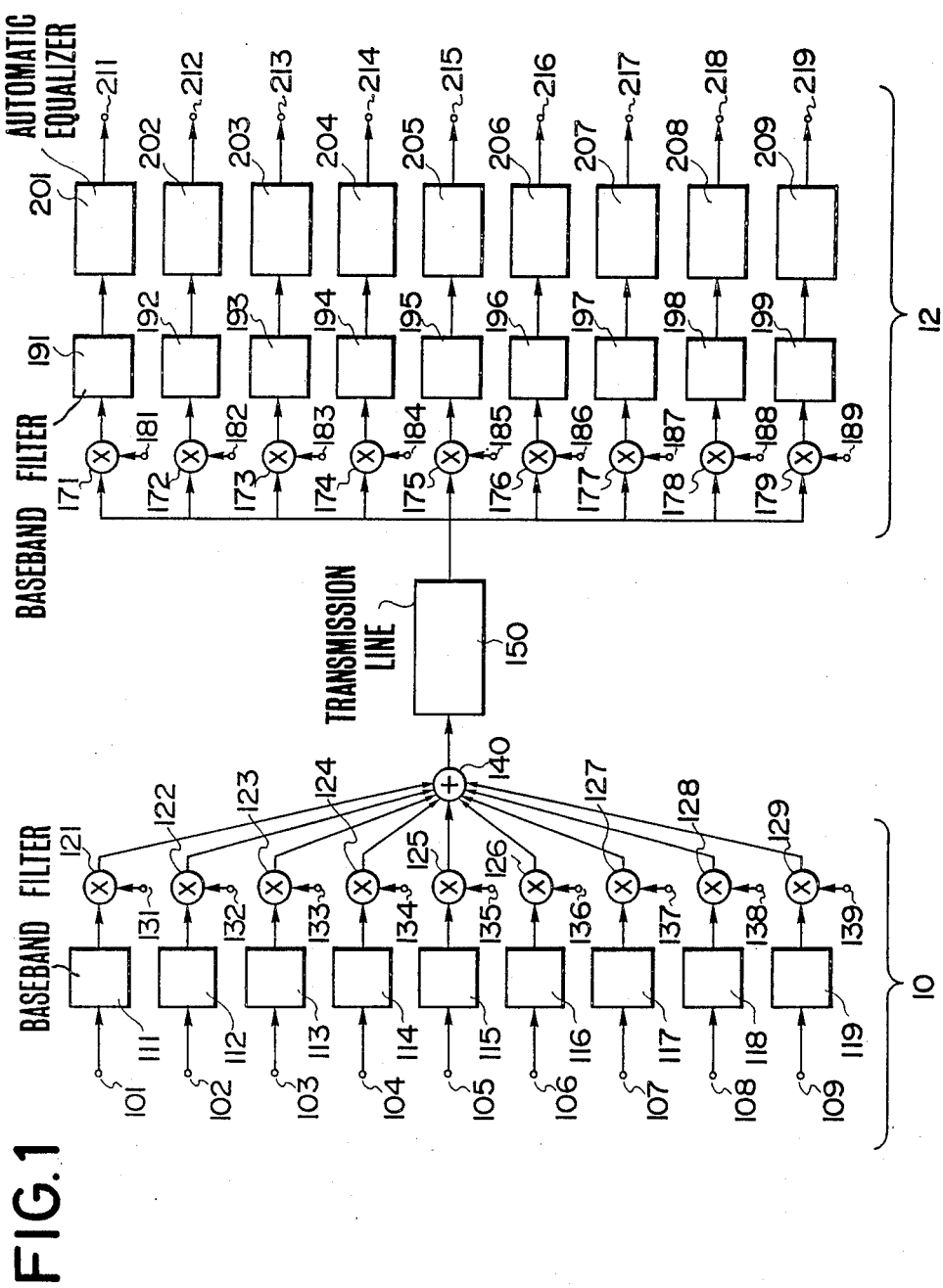
FIG. 1 shows in block diagram form an orthogonally multiplexed QAM (Quadrature Amplitude Modulation) system to which the present invention is applicable.

Referring now to FIG. 1, wherein there is shown in block diagram form an orthogonally multiplexed QAM (O-QAM (Quadrature Amplitude Modulation)) system to which the present invention is applicable. It should be noted that the present invention is not limited to O-QAM systems and is also applicable to other types of the orthogonally multiplexed parallel transmission systems.

The FIG. 1 arrangement generally comprises a transmitter section 10 and a receiver section 12 which are coupled via a transmission line 150. The transmitter section 10 includes a plurality of baseband filters 111 through 119 and a plurality of modulators 121 through 129, while the receiver section 12 includes a plurality of demodulators 181 through 189, a plurality of baseband filters substantially identical in their characteristics with the counterparts of section 10, and a plurality of automatic equalizers 201 through 209.

As shown in FIG. 1, the baseband filters 111 through 119 are supplied with complex data sequences via input terminals 101 through 109, respectively. The k-th complex data sequence $s_k(t)$ is represented by the following equations:

(in the case k is an even number)

$$s_k(t) = \sum_{m=-\infty}^{\infty} a_{k,m}\delta(t - mT) + j\sum_{m=-\infty}^{\infty} b_{k,m}\delta(t - T/2 - mT) \quad (1)$$

(in the case k is an odd number)

$$s_k(t) = \sum_{m=-\infty}^{\infty} a_{k,m}\delta(t - T/2 - mT) + j\sum_{m=-\infty}^{\infty} b_{k,m}\delta(t - mT) \quad (1)'$$

where $\delta(t)$ represents an ideal impulse response and "T" represents a symbol clock period of each channel.

It is understood from the above equations that the orthogonality between the channels is established by the time deviation of T/2 between the real and imaginary part data, and, by the skew of the delay between the odd and even channels. The baseband filters 111 through 119 are arranged to shape the incoming baseband signals and apply the outputs thereof to the modulators 121 through 129, respectively. The frequency transfer characteristics $G(\omega)$ of each baseband filter is such that $G^2(\omega)$ satisfies the Nyquist criterion. Denoting the time response of $G(\omega)$ by $g(t)$, we can write the output $x_k(t)$ of the k-th baseband filter:

(in the case k is an even number)

$$x_k(t) = \sum_{m=-\infty}^{\infty} a_{k,m}g(t - mT) + j\sum_{m=-\infty}^{\infty} b_{k,m}g(t - T/2 - mT) \quad (2)$$

(in the case k is an odd number)

$$x_k(t) = \sum_{m=-\infty}^{\infty} a_{k,m}g(t - T/2 - mT) + j\sum_{m=-\infty}^{\infty} b_{k,m}g(t - mT) \quad (2)'$$

The modulators 121 through 129 modulates complex carriers, which are respectively applied to the modulators via terminals 131 through 139, with the outputs of the baseband filters 111 through 119, respectively. Denoting the k-th complex carrier frequency by $f_k$, the difference between the adjacent complex carrier frequencies (i.e., $f_k - f_{k-1}$ has been set to be equal to baud frequency 1/T. The outputs of the modulators 121 through 129 are added at an adder 140, the output of which is transmitted to the receiver section 12 via the transmission line 150. Designating the output signal of the adder 140 by y(t), the following equation is given by $$y(t) = \sum_{k=1}^{9} Re\{x_k(t) \cdot e^{-j2\pi f_k t}\} \quad (3)$$

where $Re\{\cdot\}$ means an arithmetic operation of a real part. The term $Re\{x_k(t)\cdot e^{-j2\pi f_k t}\}$ of equation (3) represents the k-th QAM signal, so that the overall spectrum of the transmitting signal y(t) includes partly overlapping frequency ranges. More specifically, the spectrum of each of the nine QAM signals (in this instant), which are denoted by 221 through 229 in FIG. 2, includes a frequency range(s) partly overlapped with the adjacent spectrum(s).

Turning back to FIG. 1, the demodulators 171 through 179 are supplied with the transmitted data via the line 150, and demodulate same using complex carriers applied thereto via terminals 181 through 189 respectively, thereby producing corresponding baseband signals. The k-th complex carrier is denoted by $e^{j2\pi f_k t}$. Denoting the function obtained from the convolution integral of g(t) and g(t) by f(t), the output of the k-th baseband filter ($z_k(t)$) is given by:

(in the case k is an even number)

$$z_k(t) = \sum_{m=-\infty}^{\infty} a_{k,m}f(t - mT) + j\sum_{m=-\infty}^{\infty} b_{k,m}f(t - T/2 - mT) \quad (4)$$

(in the case k is an odd number)

$$z_k(t) = \sum_{m=-\infty}^{\infty} a_{k,m} f(t - T/2 - mT) + j \sum_{m=-\infty}^{\infty} b_{k,m} f(t - mT) \quad (4)'$$

In the actual systems, however, the function $z_k(t)$ is distorted or not maintained due to the interchannel and/or intersymbol interferences. For this reason, automatic equalizers 201 through 209 are provided to eliminate or equalize these interferences. Thus, the outputs of the automatic equalizers 201 through 209, which are respectively derived through output terminals 211 through 219, correspond to the baseband signals applied to the filters 111 through 119 of the transmitter section 10.

For further detail of the O-QAM system, reference should be had to "An Analysis of Automatic Equalizers for Orthogonally Multiplexed QAM Systems", IEEE Transactions on Communications, Vol. COM-28, No. 1, January 1980.

Figure 2:
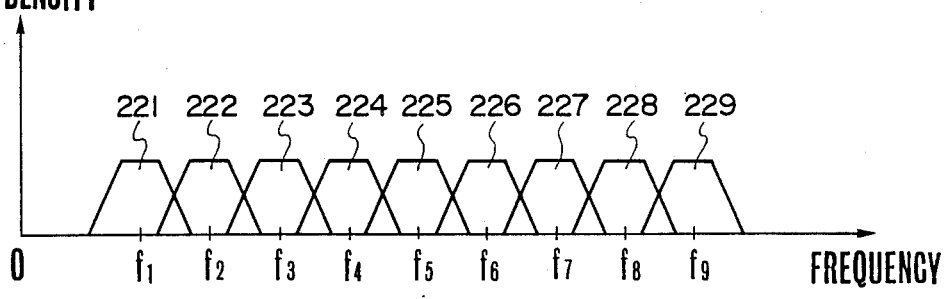
FIG. 2 shows the spectrum of nine QAM signals of the FIG. 1 system.

Thus far, the outlines of the orthogonally multiplexed parallel data transmission system to which the present invention is applicable have been described in connection with the O-QAM system shown in FIGS. 1 and 2. In the following, the preferred embodiments of this invention will be discussed in detail.

The first embodiment of the present invention is directed to a method of rapidly synchronizing parallel channels after the intial operation, which method can be implemented with a circuit of simple configuration.

This embodiment will be described with reference to FIGS. 2 through 6, wherein FIG. 2 has been referred to already. It should be noted that the first embodiment is applicable to a two-dimensional automatic equalizer in which complex (viz., real and imaginary) data are automatically equalized. The detail configuration of the two-dimensional automatic equalizer is not presented with the first embodiment, but will be described when discussing the second embodiment of the present invention.

It is known that in the orthogonally multiplexed parallel data transmission system, the center channel (225 in FIG. 2) of the transmission bandwidth is not liable to be affected by channel imperfections or transmission distortions. In other words, a large eye-opening is available in front of the automatic equalizer allocated to the center channel. This is the reason why the center channel is commonly utilized as a reference channel. As a consequence, in the case where only the center tap of the real part of the automatic equalizer assigned to the center channel is initially weighed by "1", this automatic equalizer is able to produce a correctly discriminated output from the initial operation. More specifically, the automatic equalizer assigned to the center or reference channel is capable of automatically restoring or converging to a desired condition by itself. The first embodiment of the present invention utilizes this characteristics of the orthogonally multiplexed parallel data transmission system.

Figure 3:
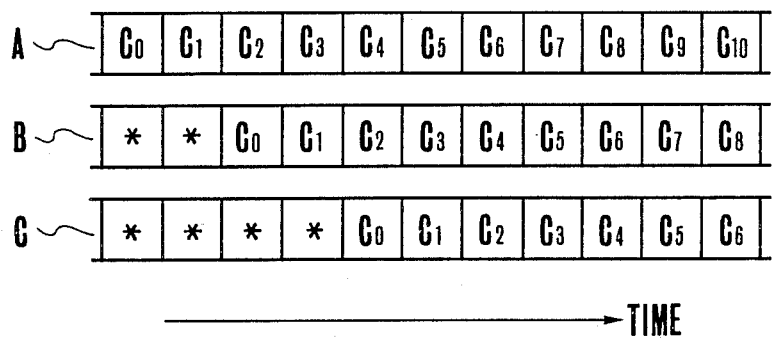
FIG. 3 is a chart showing three random complex data sequences which are preferably used to implement the first embodiment of the present invention.
Figure 4:
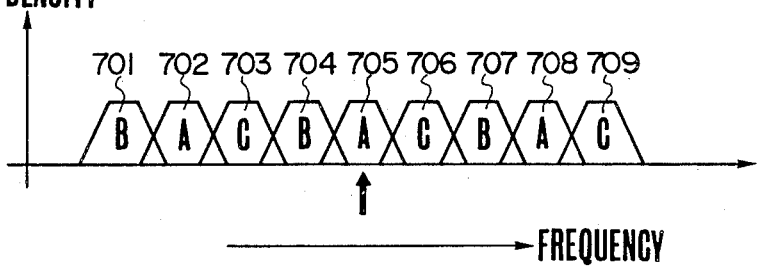
FIG. 4 shows a spectrum of nine QAM signals for the purpose of explaining the operation of the first embodiment.

FIG. 3 is a chart showing three random complex data sequences A, B and C, which are preferably used to implement the first embodiment of this invention, and which are transmitted prior to an actual data transmission in order to ensure the normal operations of automatic equalizers allocated to parallel channels (in other words, in order to synchronize the parallel channels). As shown, the data sequences B and C are respectively delayed by two and four symbols relative to the data sequence (reference data sequence) A. The center channel (225 in FIG. 2) is arranged to transmit the sequence A, while each of the other eight channels transmit one of the three data sequences A, B and C. It should be noted that when assigning the data sequences A, B and C to the channels except for the reference channel, careful attention must be paid to the fact that there exists spectrum overlapping between the adjacent channels. More specifically, in case there exists an intimate correlation between the data of the fifth and the adjacent channels, there is a possibility that the center tap coefficient of the real part of the automatic equalizer may converge to an undesirable tap coefficient. In order to avoid this problem, the random data sequences A through C are allocated to the channels in a manner not to be transmitted through the adjacent channels, the manner of which is shown in FIG. 4 which is substantially identical to FIG. 2. In FIG. 4, reference numerals 701 through 709 are the channel numbers and correspond to 221 through 229 of FIG. 2, respectively. The black bold line arrow indicates the center channel and the spectrum thereof.

Figure 5:
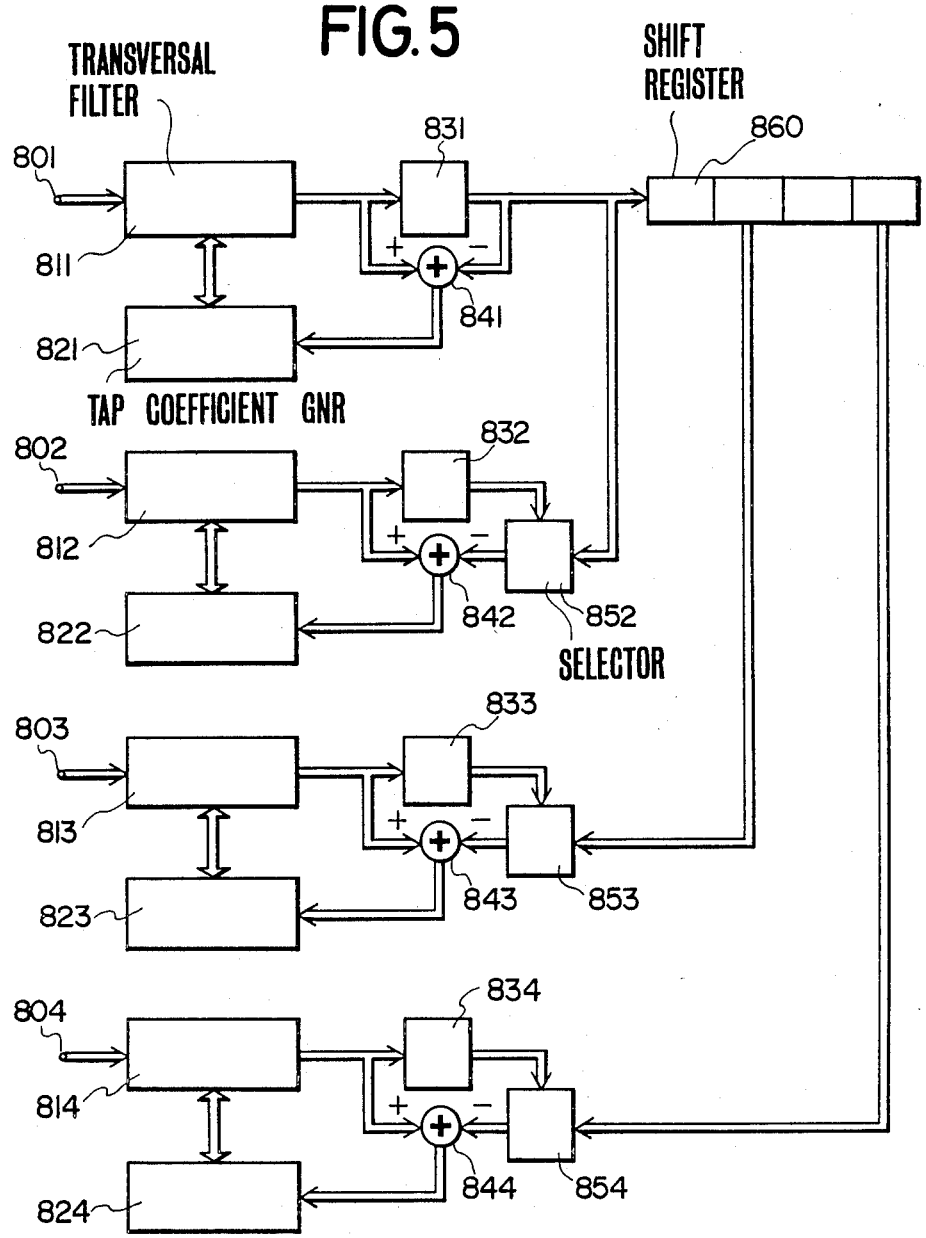
FIG. 5 shows in block diagram form a part of a receiving section of the orthogonally multiplexed parallel data transmission system, used in conjunction with a first embodiment of the present invention.

In order to derive a better understanding of the first embodiment of the present invention, reference is made to FIG. 5 which shows, in block diagram form, a part of the receiving section of the orthogonally multiplexed parallel data transmission system.

In FIG. 5, the reference data sequence A is applied through the reference channel 705 to an automatic equalizer (transversal filter) 811. The output of the automatic equalizer 811 is applied to a discriminator 831 and also to an error signal generator 841. The output of the discriminator 831 is applied to the generator 841 and to a shift register 860. The error signal generator 841 applies the output thereof to a tap coefficient circuit 821. As previously referred to, the reference channel is not liable to be affected by transmission imperfections, so that the automatic equalizer 811 can normally implement the equalization by itself (or by so-called self-learning). The shift register 860 is arranged to delay the incoming reference data sequence by two symbols, and thence applies the delayed sequence (viz., the data sequence B) to a selector 853 which is allocated to the channel 707. The shift register 860 further delays the reference data sequence A by four symbols and applies the delayed sequence (viz., the data sequence C) to a selector 854 which is allocated to the channel 706. On the other hand, the output of the discriminator 831 (viz., the reference sequence A) is directly applied to a selector 852 which is allocated to the channel 708. In FIG. 5, each of the reference numerals 812, 813 and 814 denotes an automatic equalizer, while each of reference numerals 832, 833 and 834 denotes a discriminator. Further, each of reference numerals 842, 843 and 844 denotes an error signal generator. After completion of the parallel channel synchronization, the selectors 852, 853 and 854 selects the outputs of the discriminators 832, 833 and 834, respectively, in order to receive actual data transmitted.

Figure 6:
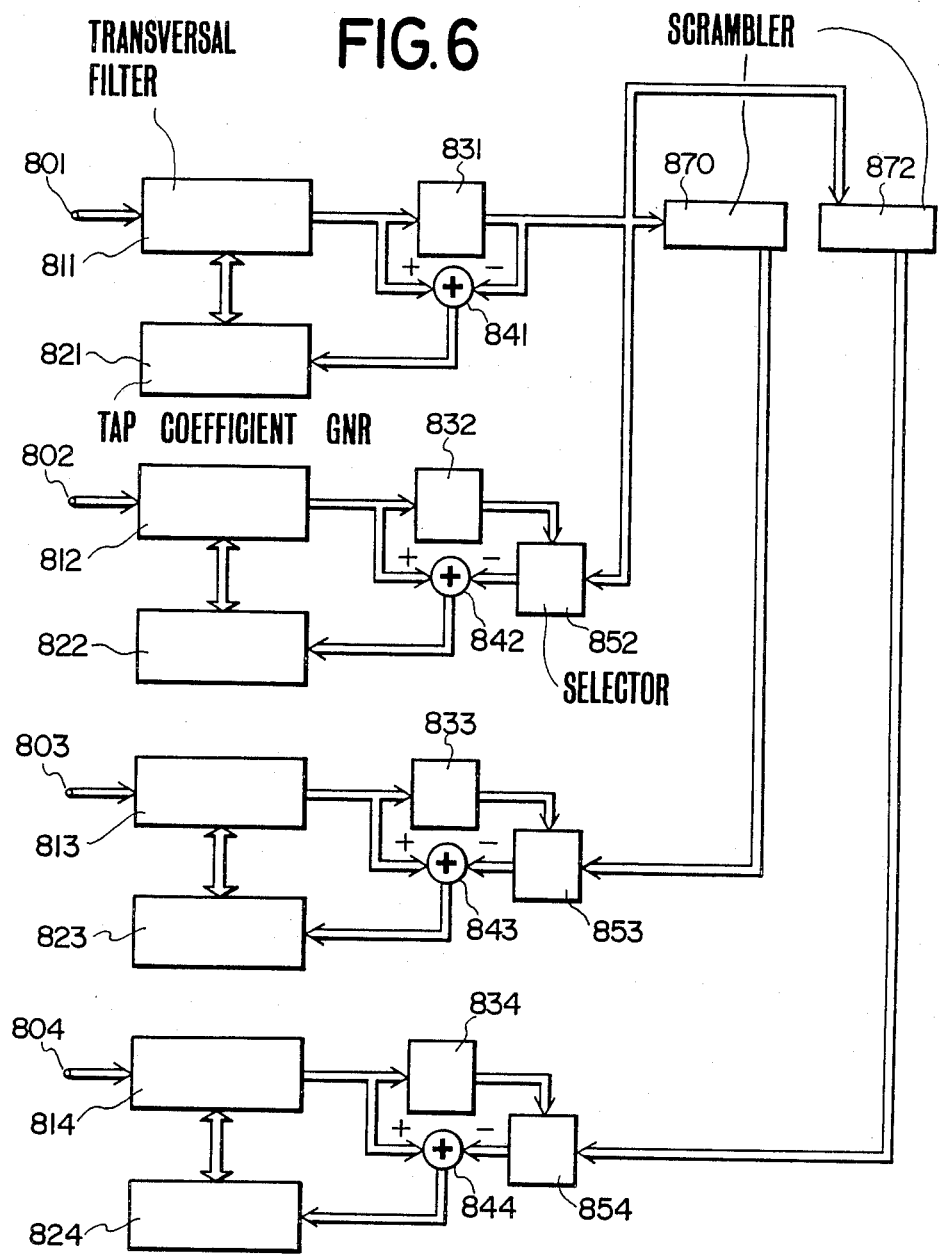
FIG. 6 shows in block diagram form a part of a receiving section of the orthogonally multiplexed parallel data transmission system, used in conjunction with a modification of the first embodiment.

Referring now to FIG. 6, there is shown in block diagram form a part of a receiver of the orthogonally multiplexed parallel data transmission system. The FIG. 6 arrangment is a modification of the first embodiment shown in FIG. 5, and is similar to the latter arrangement except that the former arrangement includes first and second scramblers 870 and 872 in place of the shift register 860. As shown, the first scrambler 870 is arranged to receive a reference random data sequence from the discriminator 831, and thence applies a first scrambled data sequence to the selector 853, while the second scrambler 872 is supplied with the reference random data sequence and applies a second scrambled data sequence to the selector 854. Since there are no correlations among the reference data sequence and the first and second scrambled data sequences, the same functions as mentioned with reference to the first embodiment can be obtained. Further, this modification has an advantage over the first embodiment in that there is no time consumption due to the delayed operation in the shift register 860.

It should be noted that (a) a transmitter associated with the FIG. 5 arrangement is provided with counterparts of the shift register 860, selectors 852, 853 and 854, and (b) a transmitter associated with the FIG. 6 arrangement is provided with the counterparts of the scramblers 870 and 872 and the selectors 852, 853 and 854.

Figure 7:
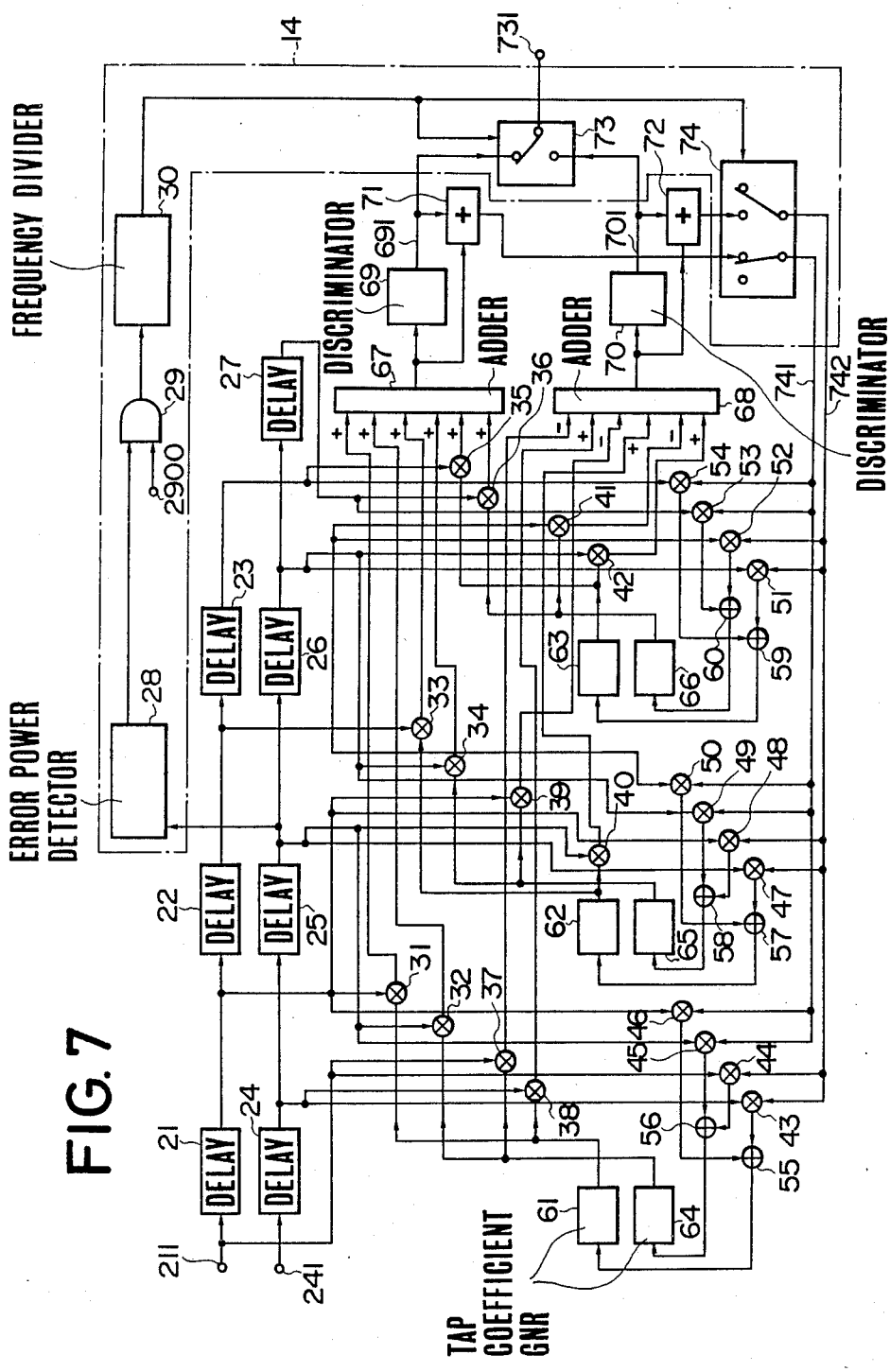
FIG. 7 shows in block diagram form an automatic equalizer to which the second embodiment of the present invention is applicable.

Referring now to FIG. 7, wherein there is shown in block diagram form an automatic equalizer of the transversal type to which the second embodiment of the present invention is applicable.

The subject matter of this embodiment resides in the provision of an error electric power detecting section 14 which comprises an error electric power detector 28, an AND gate 29, a frequency divider 30 and two switching means 73 and 74. Prior to the discussion of this embodiment, the FIG. 7 arrangement except for the above-mentioned section 14 will first be described. This description will be somewhat simplified in that it is not directly concerned with the second embodiment.

A real part data sequence is applied through an input terminal 211 to delay circuits (or shift registers) 21, 22 and 23 in this order. Similarly, an imaginary part data sequence is applied through an input terminal 241 to delay circuits 24, 25, 26 and 27 in this order. Each delay circuit provides a delay of T/2 seconds with the input data applied thereto, where T is the symbol interval of the input data stream. It should be noted that the data sequences of the real and imaginal parts have been sampled by sampling clock signals with a period of T/2 seconds before being applied to the input terminals 211 and 241, respectively.

As shown, the real part data which is applied to the delay circuit 21, is also applied to a multiplier 37. The outputs of the delay circuits 21, 22, 23, 24, 25, 26 and 27 are tapped off and applied to multipliers 31, 33, 35, 38, 32, 34 and 36, respectively. The multipliers 31 through 36 multiply the outputs of the associated delay circuits with the outputs of tap coefficient circuits 61 through 66, and thence supply an adder 67 with the products or the results thereof. The adder 67 produces the sum of the inputs thereto which is applied to a discriminator 69. In a similar manner, the multipliers 37 through 42 multiply the outputs of the associated delay circuits with the outputs of the tap coefficient circuits 61 through 66, and thence supply another adder 68 with the products thereof. The adder 68 produces the sum of the inputs thereto which is applied to a discriminator 70.

The discriminator 69 applies the output thereof to an error detector 71 via a line 691, while the error detector 71 receives the output of the adder 67 and produces an error signal of the real part data, wherein each of the discriminator 69 and the error detector 71 produces the output thereof every time interval of T. Similarly, the discriminator 70 applies the output thereof to an error detector 72 via a line 701, while the error detector 72 is supplied with the output of the adder 68 and produces an error signal of the imaginary part data. Each of the discriminator 70 and the error detector 72 produces the output thereof every time interval of T. It should be noted that there exists a time difference of T/2 between the output timings of discriminators 69 and 70 and also between the output timings of the error detectors 71 and 72.

The error detector 71 supplies the error signal thereof to multipiers 45, 46, 49, 50, 53 and 54 via the switching means 74 of the section 14 and a line 741, while the error detector 72 supplies the error signal thereof to multipiers 43, 44, 47, 48, 51 and 52 via the switching means 74 of the section 14 and a line 742. These multipliers 43 through 54, together with associated adders 55 through 60, control the weighting values of the tap coefficient circuits 61 through 66. The operation of the above-mentioned equalizer will not be described, in that it is understandable by those skilled in the art and the detailed discussion thereof will depart from the aspect of the second embodiment.

When the automatic equalizer shown in FIG. 7 is initially operated, there is a possibility that the symbol sample timing at the transmitter differs from the corresponding timing at the receiver by an amount in excess of T/4 seconds. In such a case, an extremely large amount of time is required until the automatic equalizer normally implements the equalization. This undesired tendency becomes remarkable as the timing difference approaches to T/2 seconds. An effort to overcoming this difficulty has not been proposed heretobefore.

In brief, the second embodiment overcomes this problem by switching over between the equalization orders of real and imaginary parts (in other words, by shifting the timing difference by T/2 seconds), if such an undesired phenomenon takes place. According to the second embodiment, the timing difference in excess of T/4 seconds is detected by deriving the output of the delay circuit 25. It should be noted that in the normal seperation, T/2 seconds is exactly the timing difference between the outputs of the delay circuit 25 and the discriminator 69.

The second embodiment will be discussed in more detail with reference to the section 14 and FIGS. 8(A) and 8(B). FIG. 8(A) is a graph showing two error powers in which (a) the broken line M denotes the power detected at the detector 28 and (b) the solid line R denotes the power of the output of the delay circuit 25. On the other hand, FIG. 8(B) is a graph showing the FIG. 8(A) which has been shifted by T/2 seconds in response to the timing difference in excess of T/4 seconds. It is understood from the graph shown in FIG. 8 that the error power M takes a maximum value if the timing difference is zero and (b) the error power M is gradually lowered as the timing difference becomes large.

The error power detector 28 includes a discriminator and an error signal generator, which corresponds respectively to the discriminator 69 and the generator 71 (for example), in addition to a square circuit (not shown) for obtaining the error power by squaring the error voltage applied.

The detector 28 normally applies a logic "1" to the AND gate 29. On the contrary, the detector 28 outputs a logic "0" as a clock inhibit signal, when the timing difference in question exceeds T/4 seconds, or when the detector 28 detects the error power in excess of a threshold "H". The AND gate 29 is always supplied with a clock signal (logic "1") with a period of T/2 seconds via an input terminal 2900, and hence outputs a logic "1" with a period of T/2 unless the clock inhibit signal is applied from the detector 28. Therefore, the AND gate 29 normally outputs a clock signal with a period T/2 seconds. The frequency divider 30 receives the output of the AND gate 29 and divides the frequency thereof by one half, thereby producing a clock signal with a period T seconds. This clock signal is applied to the switching means 73 which alternately couples the outputs of the discriminators 69 and 70 to an output terminal 731 in response to the applied clock. On other other hand, the clock signal from the frequency divider 30 is applied to the other switching means 74. This means 74 is arranged to couple the error signal detector 71 to the line 741 in response to the application of the clock signal, and couple the error signal detector 72 to the line 742 in the absence of the clock signal.

Contrarily, after the AND gate 29 outputs a logic "0" in response to the clock inhibit signal (viz., a logic "0") applied thereto, the frequency divider 30 produces a train of clock pulses which are delayed by T/2 seconds. This means that one of the outputs of the discriminators 69 and 70 is derived twice in sequence from the output terminal 731, after which the order of the derived outputs of the discriminators 69 and 70 (viz., the derived order of the real and imaginary part data) is inversed. At the same time, the switching means 74 responds to the absence of the clock signal, whereby the automatic equalizer shown in FIG. 7 controls the equalization along the black bold line arrow shown in FIG. 8(B).

It is clearly seen from the foregoing that in accordance with the second embodiment, the extremely rapid restoration of normal equalization is attainable even if the timing difference exceeds T/4 seconds.

Figure 9:
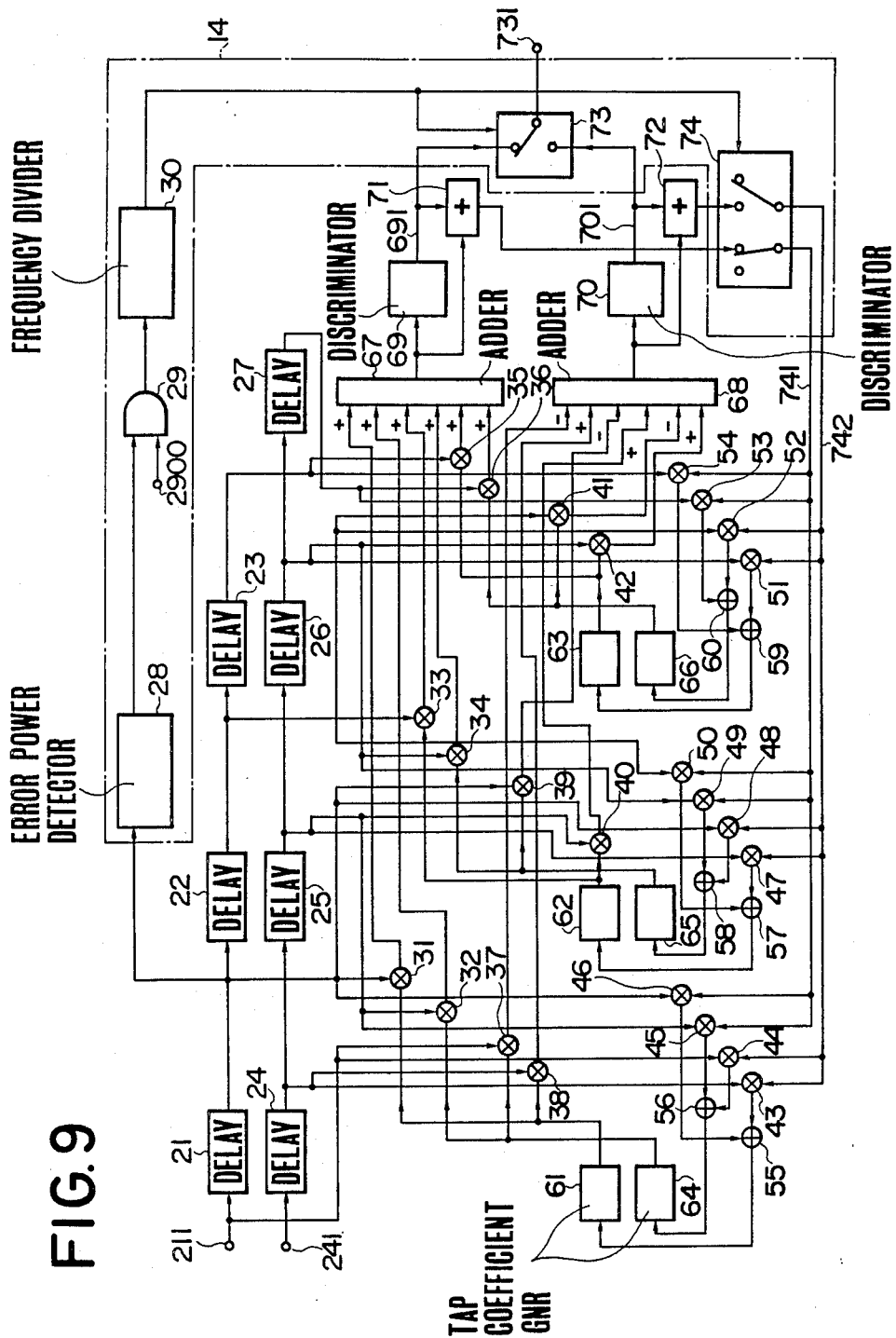
FIG. 9 shows in block diagram form an automatic equalizer to which the third embodiment of the present invention is applicable.

FIG. 9 shows in block diagram form the third embodiment of the present invention which is the same as the second embodiment except that the former embodiment derives the error voltage from the output of the delay circuit 21. Since each delay circuit of the automatic equalizer now discussed provides the input thereof with a delay time of T/2 seconds, the third embodiment functions in the same manner as the second embodiment. The other portions of FIG. 9 is exactly the same as those of FIG. 8, so that further description will be omitted for simplicity.

Figure 10:
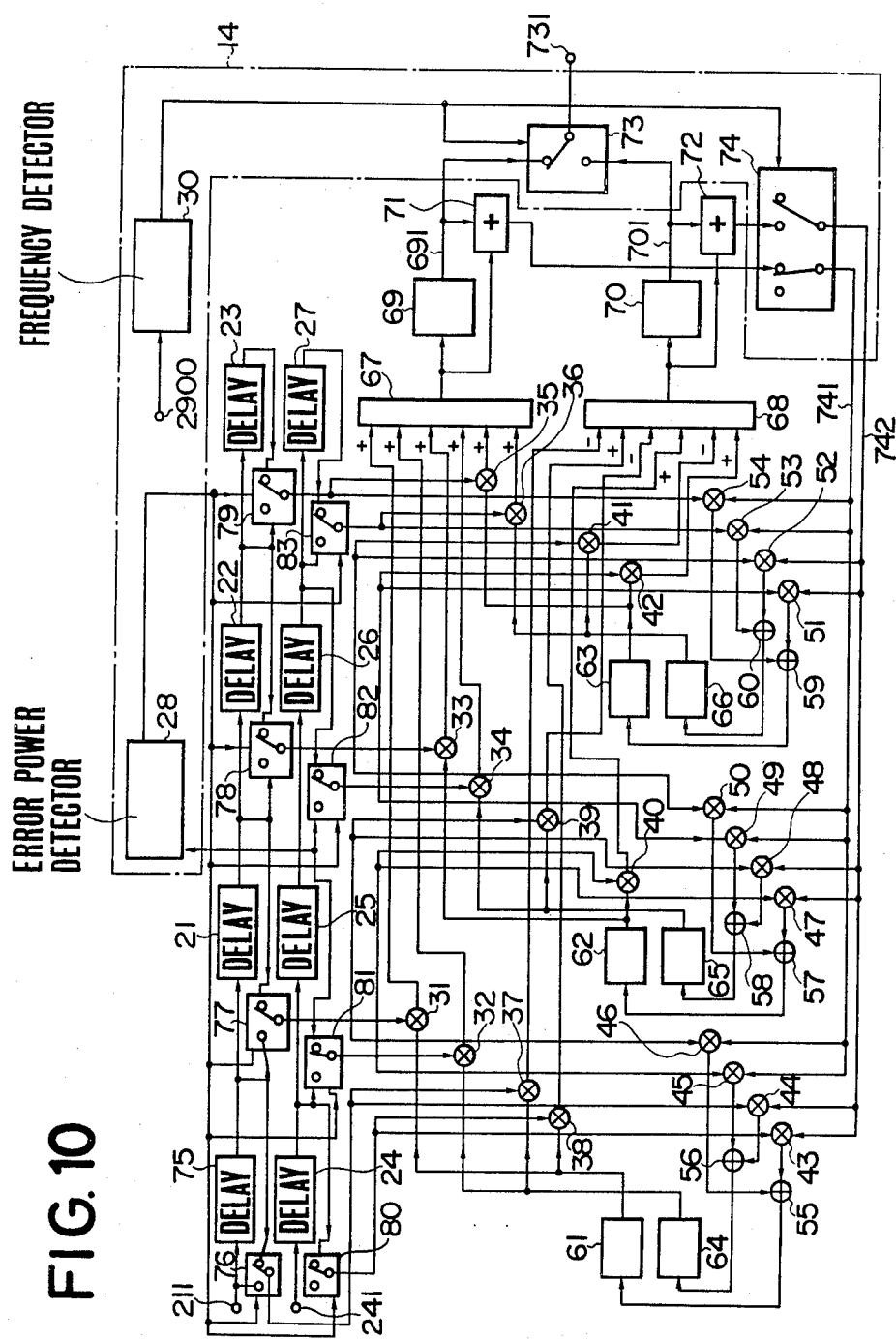
FIG. 10 shows in block diagram form an automatic equalizer to which the fourth embodiment of the present invention is applicable.

FIG. 10 shows in block diagram form a fourth embodiment of the present invention. This embodiment differs from the second embodiment shown in FIG. 7, via the inclusion of an additional delay circuit 75 and additional eight switching means 76 through 83, and the omission of the AND gate 29. The fourth embodiment attains the same function as the second embodiment. More specifically, the switching means 76 through 83 are responsive to the inhibit signal applied from the error power detector 28 and directly changes the connections of the taps to the multipliers 31 through 42, thereby compulsorily shifting the timing difference by T/2. Other portions of FIG. 10 is similar to those of FIG. 8, so that further descriptions will be omitted.

Figure 11:
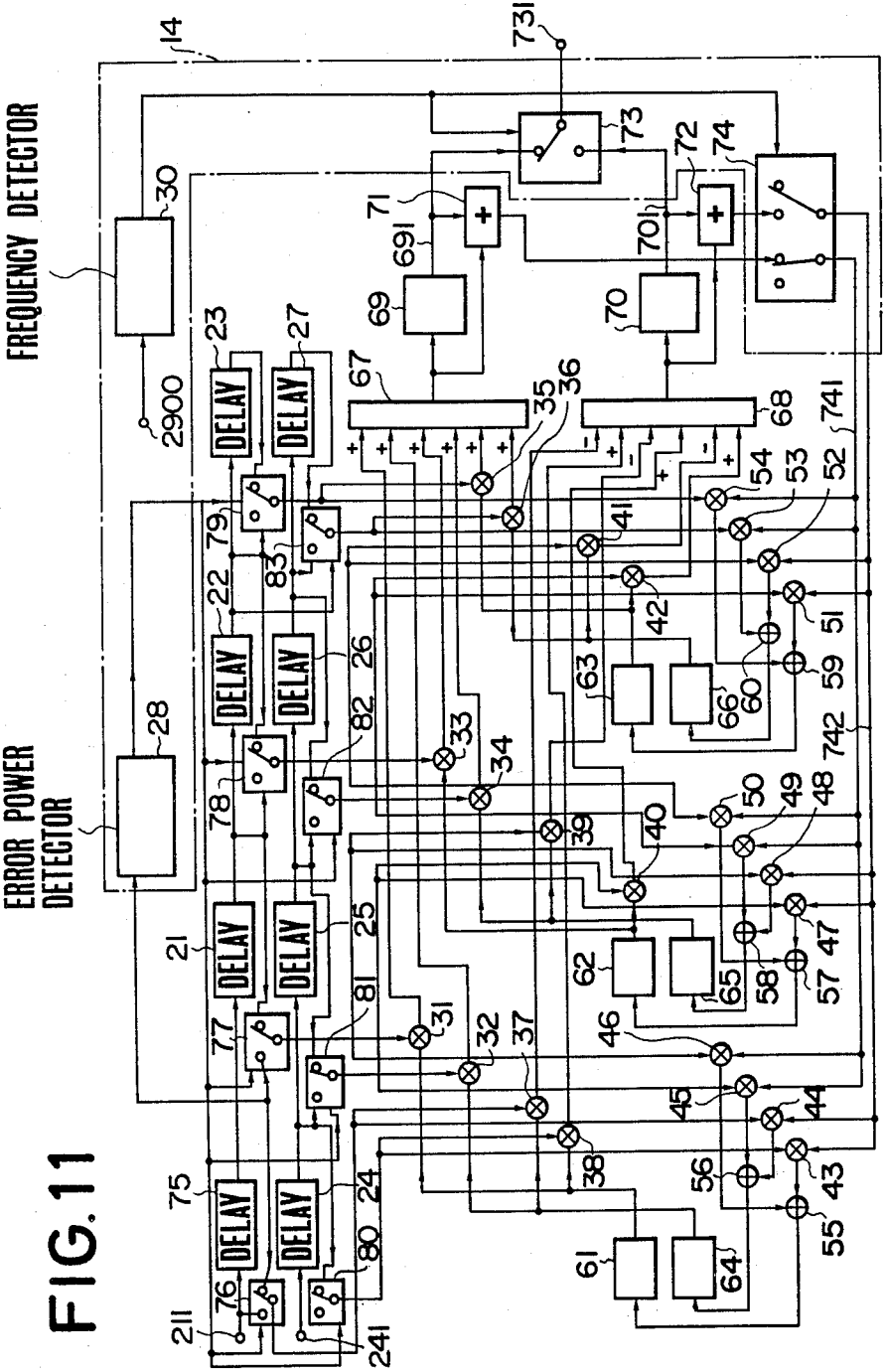
FIG. 11 shows in block diagram form an automatic equalizer to which the fifth embodiment of the present invention is applicable.

FIG. 11 shows in block diagram form the fifth embodiment of the present invention which is the same as the fourth embodiment except that the former embodiment derives the error voltage from the output of the delay circuit 75, and which functions in the same manner as the aforementioned fourth embodiment. The relation between the fourth and fifth embodiments is similar to the relation between the second and third embodiments. The operation of the FIG. 11 circuit is readily understood in view of the preceding discussions.

The foregoing description shows only preferred embodiments of the present invention. Various modifications are apparent to those skilled in the art without departing from the scope of the present invention. For example, in FIG. 7, the reference tap has been assigned to the center tap, but is selectable to another tap depending on the condition of transmission line, etc. Further, in FIG. 7, only the tap coefficient of the circuit 62 has been set to "1". However, as an alternative, only the tap coefficient of the circuit 65 may be assigned "1" while the others being allocated "0", in the case of which the same function can be achieved.

The foregoing description shows only preferred embodiments of the present invention. Various modifications are apparent to those skilled in the art without departing from the scope of the present invention which is only limited by the appended claims.

What is claimed is:

1. A method of synchronizing parallel channels of an orthogonally multiplexed parallel data transmission system, comprising the steps of:
   (a) transmitting a reference data sequence via a reference channel, and transmitting a data sequence obtained by scrambling said reference data sequence via another channel;
   (b) receiving said reference data sequence at a first automatic equalizer which is arranged in said reference channel, and receiving the scrambled data sequence at a second automatic equalizer which is arranged in said other channel;
   (c) using the received reference data sequence to establish an inital equalization of said first automatic equalizer, and scrambling the received reference data sequence;
   (d) using the scrambled reference data sequence obtained in step (c) and the transmitted scrambled data sequence to establish an initial equalization of said second automatic equalizer.

2. A method as claimed in claim 1, further cpmprising step of:
   ceasing the application of the scrambled reference data sequence obtained in step (c) to said second automatic equalizer to allow self-learning equalization thereof.

3. A method as claimed in claim 1, wherein said first automatic equalizer comprises:
   a first group of tapped delay circuits coupled in series with one another to receive a real part data sequence, each delay circuit providing the input thereof with a delay of T/2 seconds where T represents a period of symbol clock pulses;
   a second group of tapped delay circuits coupled in series with one another to receive an imaginary part data sequence, each delay circuit providing the input thereof with a delay of T/2 seconds;
   a tap coefficient controlling means coupled to said first and second groups; and
   an error power detecting means for receiving, every time interval of T, a data signal tapped from one of said first and second groups, said data signal being delayed or advanced by T/2 seconds relative to a reference tap of said first group, said error power detecting means being adapted for inverting the equalizations of the real and imaginary part data sequences fed to said tap coefficient controlling means by delaying the symbol clock pulse by T/2 in the event that the power of theraceived data signals is below a predetermined level.

4. A method as claimed in claim 3, wherein said predetermined level corresponds to T/4 seconds of timing difference between the data transmission and the data reception.

5. A method as claimed in claim 1, wherein said first automatic equalizer comprises:
- a first group of tapped delay circuits coupled in series with one another to receive a real part data sequence, each delay circuit providing the input thereof with a delay of T/2 seconds where T represents a period of symbol clock pulses;
- a second group of tapped delay circuits coupled in series with one another to receive an imaginary part data sequence, each delay circuit providing the input thereof with a delay of T/2 seocnds;
- a tap coefficient controlling means which is coupled to said first and second groups, and which includes two control sections for controlling the equalizations of said real and imaginary part data sequences respectively;
- a switching means provided between said tap coefficient control sections and said first and second groups; and
- an error power detecting means for receiving, every time interval T, a data signal tapped from one of said first and second groups, said data signal being delayed or advanced by T/2 seconds relative to a reference tap of said first group, said error power detecting means being adapted for inverting the connections of said first and second control sections to said first and second groups by controlling said switching means in the event that the power of the received data signal is below a predetermined level.

6. A method as claimed in claim 5, wherein said predetermined level corresponds to T/4 seconds of timing difference between the data transmission and the data reception.

7. A method of synchronizing parallel channels of an orthogonally multiplexed parallel data transmission system, comprising the steps of:
  (a) transmitting a reference data sequence via a reference channel, and transmitting a data sequence obtained by delaying said reference data sequence via another channel;
  (b) receiving said reference data sequence at a first automatic equalizer which is arranged in said reference channel, and receiving the delayed data sequence at a second automatic equalizer which is arranged in said other channel;
  (c) using the received reference data sequence to establish an inital equalization of said first automatic equalizer, and delaying the received reference data sequence;
  (d) using the delayed reference data sequence obtained in step (c) and the transmitted delayed data sequence to establish an initial equalization of said second automatic equalizer.

* * * * *